J. B. MacDONALD.
ROTARY BAKE OVEN.
APPLICATION FILED MAR. 3, 1919.

1,403,796.

Patented Jan. 17, 1922.
2 SHEETS—SHEET 1.

Inventor
Jack B. MacDonald

By Harry C. Schroeder
Attorney

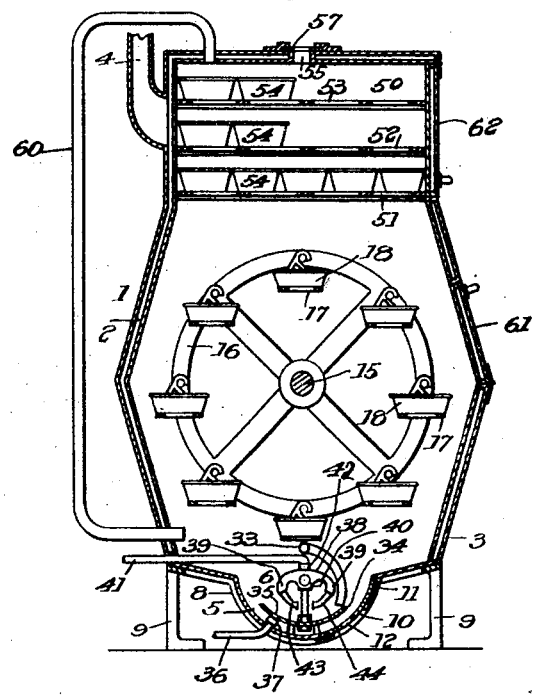

UNITED STATES PATENT OFFICE.

JACK B. MacDONALD, OF OAKLAND, CALIFORNIA.

ROTARY BAKE OVEN.

1,403,796.   Specification of Letters Patent.   Patented Jan. 17, 1922.

Application filed March 3, 1919. Serial No. 280,318.

*To all whom it may concern:*

Be it known that I, JACK B. MacDONALD, citizen of the United States, residing at Oakland, in the county of Alameda and State of California, have invented certain new and useful Improvements in Rotary Bake Ovens, of which the following is a specification.

This invention is an improved rotary bake oven.

The invention is illustrated in the accompanying drawings which form a part of this specification and the appended claims.

Referring to the drawings:

Figure 3 is a transverse vertical section of the oven.

Figure 1:
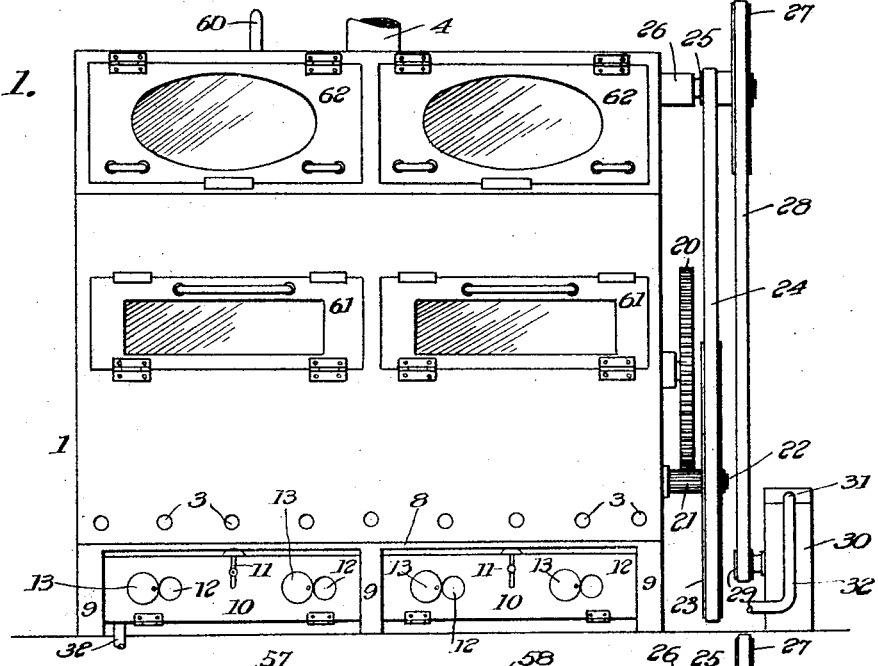
Figure 1 is a side elevation of the oven.
Figure 2:
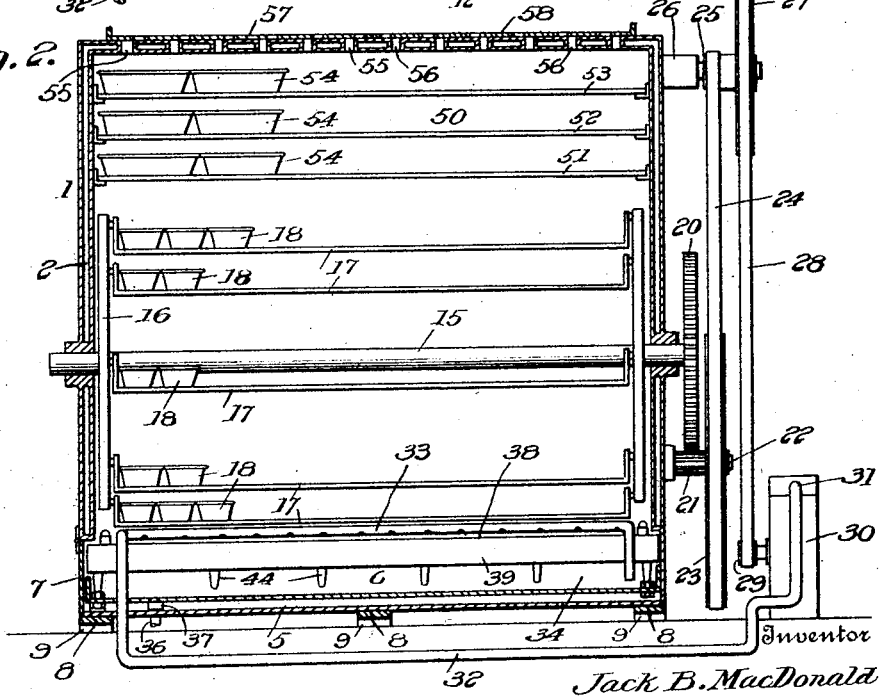
Figure 2 is a longitudinal section of the oven.

In the drawings, 1 indicates the oven casing having double walls providing an air space 2 therein. The front wall of the oven is provided with air inlets 3 through which air is admitted into the space 2. The rear wall of the oven is provided with an outlet 4 through which air after circulating through the space 2 in the walls of the oven, escapes. The bottom wall of the oven is formed with a longitudinal trough-shaped combustion chamber 5 in which rests a burner 6, which may be introduced in said chamber or removed therefrom through a door 7 at one end of the oven casing. The burner 6 is preferably constructed like the burner disclosed in my copending application Serial No. 280,317. The bottom wall of the casing rests upon a cradle 8 formed with legs 9 whereby the oven is supported in an upright position. Doors 10 are hinged in the wall of the combustion chamber 5 to permit access to the chamber. Catches 11 hold said doors closed. Air inlets 12 are provided in the doors 10 which are controlled by dampers 13.

A shaft 15 extends longitudinally of the oven and is journaled in suitable bearings in the end walls of the casing 1. A reel 16 is mounted on said shaft within the oven in which are pivoted shelves 17 upon which the baking pans 18 are placed. On one end of said shaft outside the casing is secured a gear 20 which meshes with a pinion 21 journaled on a stud 22 on the end wall of the oven casing. A pulley 23 is secured to pinion 21 and a belt 24 extends over said pulley and a pulley 25 journaled on a stud 26 on the end wall of the casing. A pulley 27 is also journaled on stud 26 and is secured to pulley 25 to turn therewith. A belt 28 extends over pulley 27 and over pulley 29 of a Pelton water motor 30. To the outlet 31 of said motor is connected a pipe 32 leading to the burner sprinkler 33 located directly above the burner, said sprinkler discharging into the burner pan 34 below the burner. An outlet spout 35 leads from the burner pan and an outlet pipe 36 is connected to said spout by a coupling 37. The burner includes a generator 38 formed with side members 39 and an intermediate pocket 40. Fuel inlet pipes 41 are connected by couplings 42 to the burner generator directly over the pocket 40. Jets 43 and 44 extend downwardly from the members 39 and inwardly towards each other directly under pocket 40 so that the flame of the jets heats the pocket directly and vaporizes the water which settles therein from the fuel, consisting of a mixture of oil and water, thus providing a moist gas which burns at the jets with a wet flame. The outlet 35 of the burner pan is located below the jets 43 so that the water in the pan may not rise high enough to put out the flame of the jets. The sprinkler 33 sprinkles water on top of the burner generator part of which is vaporized and the rest flows down the sides of the burner into the burner pan and out of the pan outlet, thus providing a continuous circulation of cool water about the burner which carries off the gas fumes and keeps the burner cool. The heat generated by the burner is a moist heat which is ideal for baking. An upper baking compartment 50 is formed in the oven casing above the main baking compartment in which the reel 16 is located, and communicates with said main baking compartment. Superimposed grating shelves 51, 52, and 53 are arranged in said baking compartment on which baking pans 54 are placed. Outlets 55 and 56 are provided in the upper wall of the oven casing which are controlled by sliding dampers 57 and 58 respectively. A pipe 60 leads from the upper part of the oven casing into the lower part thereof to provide circulation and equal distribution of heat through the oven. The circulation of air through air space 2 prevents escape of heat from the oven by radiation and keeps the outside of the oven walls cool so that persons will not burn their hands on the oven. Glass doors 61 are hinged in the oven casing to permit access to the main baking compartment and glass doors 62 are hinged in the upper part of the casing to permit access to the baking compartment 50.

Bread is baked in the main oven in the pans 18 on the rotating reel 16 and French bread is baked in the pans in the upper baking compartment 50.

The fuel used in the burner consisting of a mixture of oil and water eliminates carbon and reduces gaseous fumes to a minimum.

Having described my invention, I claim as new and desire to secure by Letters Patent:

1. A portable revolving bake oven comprising a casing having a baking chamber therein, a rotatable reel mounted in the chamber, a second baking chamber arranged over the first chamber and equipped with a plurality of superposed shelves shiftably mounted in said second chamber, entrance doors in the sides of the casing for each of said chambers, a burner chamber arranged beneath said first baking chamber and in open communication with said baking chamber, a heating circulating tube having one end communicating with the second baking chamber at a top portion thereof and its other end communicating with the lower portion of said first baking chamber and immediately adjacent said burner chamber.

2. In a portable baking oven, a burner in the lower part of said oven, a baking chamber over said burner, and a heat circulating tube exteriorly of the oven and having one end communicating with the upper portion of said baking chamber and its other end communicating with the lower portion of the oven adjacent the burner and within the oven, whereby the heat passing through the tube will be discharged in the oven and recirculate therethrough.

3. In a portable baking oven a casing having a bottom wall formed with a trough like chamber, extending the length of said casing, a baking reel rotatably mounted in said casing and above said chamber and extending longitudinally of the casing, a burner in said trough like chamber and slidably removable therefrom through a hinged end wall of the chamber, and doors closing openings in the side walls of said trough chamber and equipped with air inlet regulators.

4. In a portable baking oven as set forth in claim 3 characterized by a sprinkler pipe arranged over the burner and extending coextensively therewith, a drip pan for the burner and a drain pipe extending into said trough chamber and communicating with said drip pan.

In testimony whereof I affix my signature.

JACK B. MacDONALD.